Patented Aug. 17, 1937

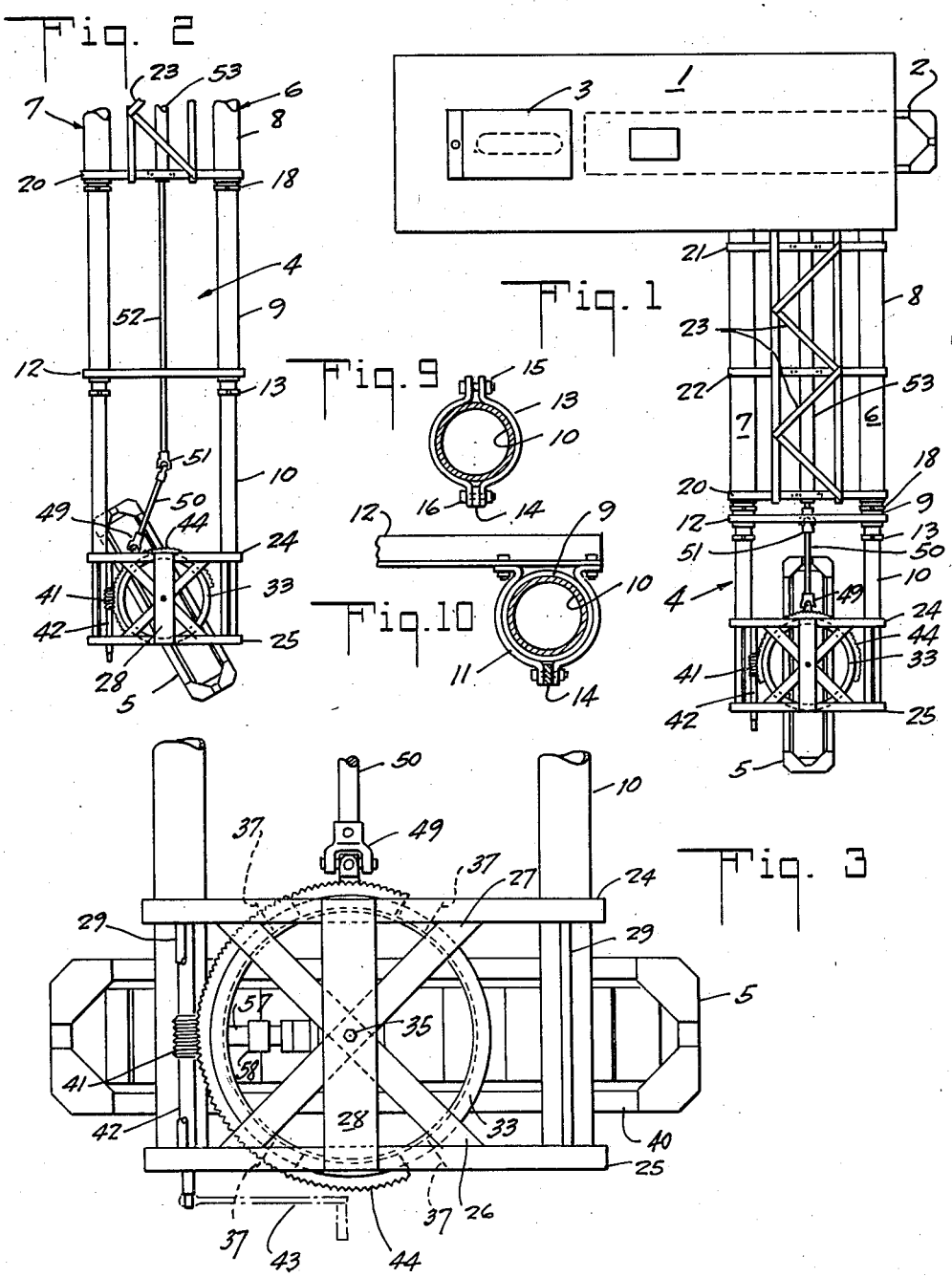

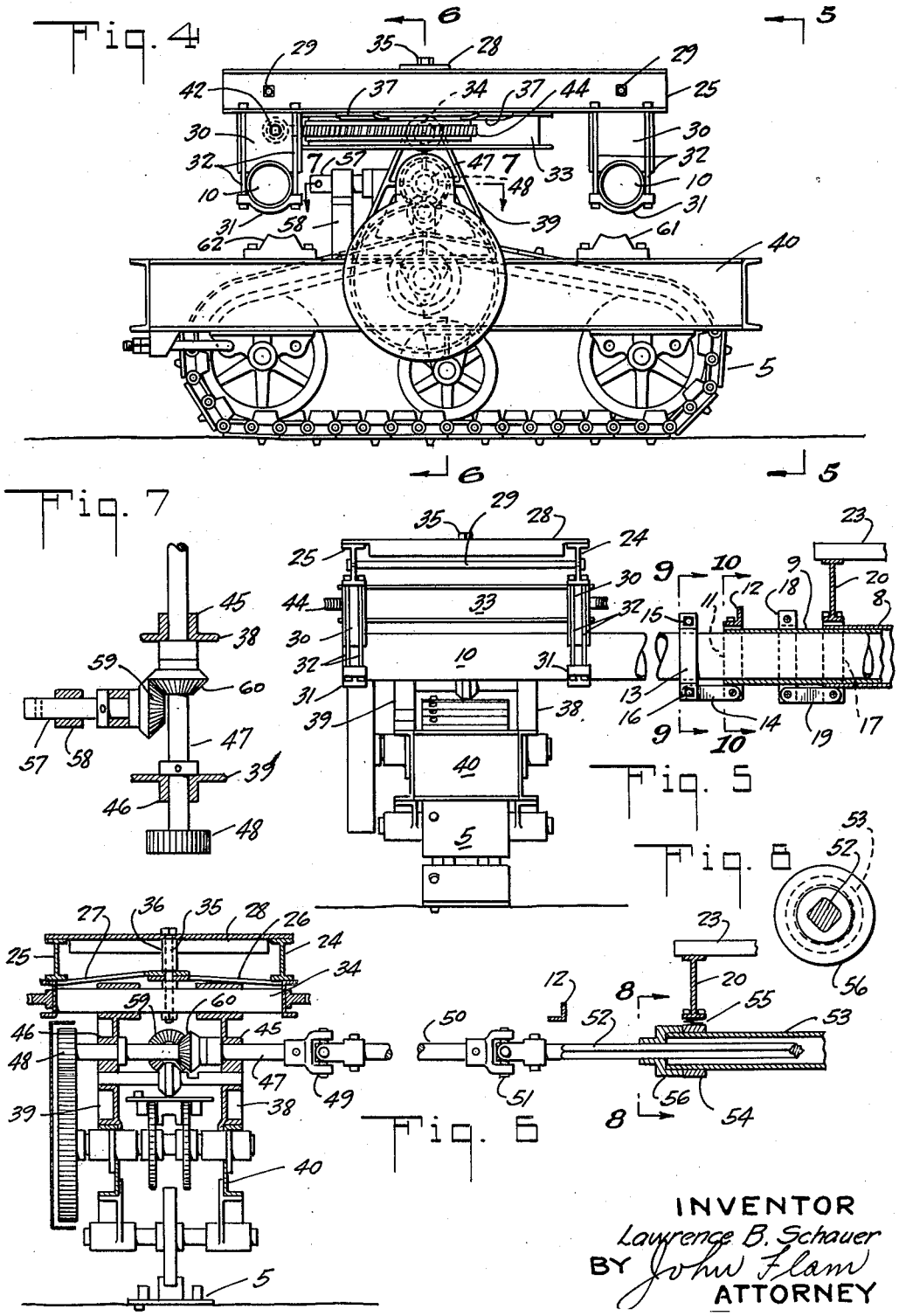

2,090,235

UNITED STATES PATENT OFFICE 2,090,235

VARIABLE TREAD VEHICLE

Lawrence B. Schauer, Huntington Park, Calif., assignor to Ruth Dredger Manufacturing Corporation, Ltd., Los Angeles, Calif., a corporation of California

REISSUED

Application November 11, 1933, Serial No. 697,620

7 Claims. (Cl. 180—9.1)

This invention relates to a portable plant, such as mounted on a vehicle. A plant of this character necessitating transportation may be road building or maintaining machinery, or dredgers or excavators.

Dredgers or excavators especially, often require that the excavating elements be carried on lateral supports, extending from the sides of the vehicle, and operating to dig a trench or ditch paralleling the motion of the vehicle. For example, a chain conveyor system, supported on lateral booms, and carrying a series of buckets, is often provided for this purpose. A crawler or other equivalent transporting device serves to support the end of the boom. It has been found in the past that it is advantageous to adjust the tread of the crawler with respect to the main body of the vehicle; that is, the lateral spacing of this "outboard" crawler and the vehicle.

Such adjustment may be desirable for example, when there is a change in the overall width of the trench or ditch being excavated. This adjustment is also desirable when the crawler is placed on the opposite bank of a channel, for excavating in the channel, to adjust for varying widths between banks.

In order to accomplish this result, telescoping pipes extending laterally from the vehicle have been used, for supporting the crawler. The telescoping movement between the pipes has been accomplished in various ways to secure the tread adjustment.

It is one of the objects of this invention to make it possible to vary the tread by the application of power from the vehicle.

It is another object of the invention so to arrange the crawler that the crawler can be adjusted in proper position to telescope the pipes in and out with respect to each other.

This effect can be obtained by so mounting the crawler that its traction can be applied not only in the direction of movement (which is its normal use), but also, when desired for tread adjustment, the traction can be applied in a direction transverse to the direction of movement.

It is accordingly another object of the invention to mount the crawler for angular adjustment about a vertical axis, while yet maintaining driving relation to the crawler mechanism.

This invention possesses many other advantages, and has other objects which may be made more easily apparent from a consideration of one embodiment of the invention. For this purpose there is shown a form in the drawings accompanying and forming part of the present specification. This form shall now be described in detail, illustrating the general principles of the invention; but it is to be understood that this detailed description is not to be taken in a limiting sense, since the scope of the invention is best defined by the appended claims.

Referring to the drawings:

Figure 1 is a plan of a vehicle chassis and its extension frame embodying the invention, the extension frame being in retracted position and the crawler supporting the extension frame being arranged to provide traction for operating it;

Fig. 2 is a fragmentary view of the extension frame showing this frame in extended position, and with the crawler supporting it in a position to exert traction for operating the extension frame and for moving the vehicle;

Fig. 3 is an enlarged detailed plan view of the crawler supporting the extension frame with parts of this frame, the crawler being in position for moving the vehicle without operating the extension frame;

Fig. 4 is an end elevation of the crawler and the extension frame;

Fig. 5 is a side view taken from the plane 5—5 of Fig. 4, but showing parts of the frame broken away to reduce the length of the figure;

Fig. 6 is a vertical sectional view taken along plane 6—6 of Fig. 4, the shaft for applying power to the crawler being broken away to reduce the length of the figure;

Fig. 7 is a detailed section taken along plane 7—7 of Fig. 4;

Fig. 8 is a detail section taken along the plane 8—8 of Fig. 6;

Fig. 9 is a detail section taken along the plane 9—9 of Fig. 5; and

Fig. 10 is a detail section taken along the plane 10—10 of Fig. 5.

In Fig. 1, the main chassis 1 of a vehicle is indicated in diagrammatic fashion. This vehicle may serve to support, as is well understood, a mechanism for excavating, or road making, or repairing. There is also indicated a main crawler 2 underneath the chassis 1, and rectangle 3 can indicate the power unit, such as a gasoline engine.

Extending laterally from the vehicle chassis 1 is an extension frame 4. This extension frame is supported at its free extremity as by a crawler 5. This crawler can be of any conventional type and its details need not be described. Crawler 5 can be used to serve as a supplemental traction means for the vehicle, the extension frame 4 extending over an intervening ditch or trench being excavated. The extension frame can also be utilized for supporting the line of excavator buckets if desired. It is made variable in length so that the extension frame can bridge trenches of different widths.

In the present instance the extension frame 4 includes a pair of sets of telescoping pipes, the sets being horizontally spaced. These sets are indicated generally at 6 and 7 on Fig. 1.

Since both sets of telescoping pipes are of similar construction, set 6 only will be described in detail. This set includes a series of nested pipes, the largest one 8 (Figs. 1, 2 and 5) being permanently attached to the side of the vehicle 1. An intermediate pipe 9 (Figs. 2 and 5) telescopes within pipe 8. These two pipes can be securely fastened together after a telescoping operation is performed. This securing means will be described hereinafter.

The innermost pipe 10 (Figs. 1, 2, 3 and 5) telescopes within the intermediate pipe 9. It is apparent that any number of pipes can be nested together to form a telescoping framework.

The manner in which the pipes can be secured together in definite telescoping relation, can be described in connection with Figs. 5, 9 and 10. Thus there is a permanently secured clamp ring 11 around the extremity of intermediate pipe 9. In the present instance this clamp ring is shown as made up of two halves, appropriately joined together and fastened also to a cross angle iron 12, extending between the sets 6 and 7. A releasable clamping ring 13 extends around the innermost pipe 10 and is also made in two halves. Connecting the clamping rings 11 and 13 is a link 14. When it is desired to move pipe 10 with respect to pipe 9, the clamping ring 13 is loosened as by loosening the clamping bolts 15 and 16. After the relative telescoping movement is accomplished between these two pipes, the bolts 15 and 16 can be again tightened on pipe 10. The rings 11 and 13 and links 14 thus form a releasable connecting means between the pipe sections 9 and 10. The link 14 serves to hold clamp ring 13 against axial movement with respect to the frame angle 12, as pipe 10 is adjusted.

A similar releasable clamping means is also provided between the largest pipe 8 and the intermediate pipe 9. For example, to pipe 8 is permanently clamped a clamping ring 17. A releasable clamping ring 18 is provided on pipe 9 and a connecting link 19 is provided between the two rings 17 and 18. A cross I-beam 20 (Figs. 1, 2, 5 and 6) is supported on the clamping ring 17 and the corresponding clamping ring on the pipe set 7. The largest diameter pipes are further connected by similar I-beams 21 and 22. In order to lend further rigidity to the structure, appropriate lattice work 23 is fastened to the upper surfaces of the I-beams 20, 21 and 22.

At the extremity of the pipe sets 6 and 7 there is provided a suspension system for the crawler 5. This suspension system includes a pair of transverse I-beams 24 and 25 (Figs. 1, 2, 3, 4, 5 and 6). These I-beams are connected together to form a rigid framework as by the crossed lattice work 26—27, the cross channel iron 28 and stay bolts 29. This rectangular framework is rigidly supported at the extremity of the inner pipes 10 as by the aid of saddle blocks 30 disposed adjacent the corners of the framework and the cap clamps 31. The pipes 10 are embraced between the blocks 30 and the caps 31, and the structure rigidly fastened thereto as by the aid of the long bolts 32 passing through the caps 31 and engaging in the lower flange of the I-beams 24 and 25.

The crawler 5 is supported by the framework just described so as to permit it to vary its angular direction of traction about a vertical axis. For example, as shown in Fig. 1, the direction of traction of crawler 5 is at right angles to the direction of motion of vehicle 1. In this way, operation of the crawler 5 in one or the other direction will produce a telescoping effect between the pipes forming the sets 6 and 7. Of course, this is done while rings 13 and 18 are loosened. After the proper adjustment is made, these clamp rings can be tightened and crawler 5 can be rotated to the position shown in Fig. 3. In this position, the crawler 5 has an angular direction of traction parallel with that of the vehicle 1 and can be used for assisting in the locomotion of the vehicle. It is also possible to set the tractor 5 at an intermediate angular position, as indicated in Fig. 2. For this position of the crawler 5, operation of the vehicle will cause the sets of pipes 6 and 7 to be telescoped simultaneously with motion of the vehicle over the ground, the relative amounts of telescoping action and transportation being determined by the particular angle at which the crawler 5 is set.

To make it possible to adjust the crawler 5 angularly about a vertical axis, use is made of a fifth wheel construction. This includes the channeled wheel 33 across which there is a diametric crawler suspension shaft 34. Passing through the shaft 34 and through the suspending framework is a pivot pin 35. A spacer bushing 36 extends around the pivot pin 35 and is held between the channel iron 28 and the lattice work elements 26 and 27. Furthermore, the upper flange of wheel 33 can be guided as by the clips 37 (Figs. 3 and 4), which are fastened to the lower flanges of the I-beams 24 and 25.

The transverse shaft 34 passes through a pair of bearing brackets 38 and 39 which are mounted on the frame 40 of the crawler 5. It is thus apparent that in order to angle the crawler 5, it is merely necessary to rotate the fifth wheel 33 about the pivot pin 35. This can be accomplished, for example, by the aid of a worm 41 (Figs. 1, 2 and 3). This worm is mounted on a manually operated shaft 42, passing through the blocks 30 and having a squared end for the accommodation of a manipulating handle 43. The worm 41 meshes with a worm wheel segment 44 fastened to the exterior periphery of fifth wheel 33. In the present instance, the worm wheel segment 44 is shown as extending beyond 180 degrees around the wheel 33, whereby its various angled positions can be obtained as desired by the operator. Furthermore, in this way the crawler 5 can be interchanged to be on the other side of the vehicle 1 and yet maintain the projecting squared end of the worm shaft 42 in available position for the operator.

The manner in which power is transmitted to the crawler 5 can be best explained in connection with Figs. 6 and 7. Brackets 38 and 39 have bearing bosses 45 and 46 immediately below the axis of transverse shaft 34. Extending through these bearing bosses is an operating shaft 47. This shaft carries at one extremity an operating pinion 48 for imparting motive power to the crawler 5. This shaft 47 can be connected as by universal joint 49 to an intermediate link 50. This intermediate link in turn is connected as by universal joint 51 to a squared shaft 52. This squared shaft 52 telescopes in a hollow shaft 53. This hollow shaft is journalled in a plurality of bearings 54 respectively supported underneath the angle irons 20, 21 and 22. This support can be resilient as by the interposition of a compression spring 55 between the bottom of each I-beam 20, 21 and 22 and the corresponding bearing 54. The hollow shaft 53 is adapted to be rotated in either direction by power derived from the vehicle 1, and this rotation is imparted to shaft 52 for all positions of telescoping between shafts 52 and 53. This can be accomplished for example, by fastening to the end of the hollow shaft 53 a cap 56 having a squared hole through which shaft 52 slides.

The link 50 with its universal joints 49 and 51 can be directly connected to shaft 47 in order to provide tractive power to the crawler 5. This position is indicated in Figs. 3 and 6. It will be evident from an inspection of Fig. 3 that by means of the worm 41 and worm wheel segment 44 the crawler can be swung through a considerable angle from the position shown. The amount of this movement depends upon the details of the universal joints, but in practice it has been found desirable that it should not exceed 30°. However, when it is desired to transmit power to the crawler 5 for the telescoping position of Fig. 1 or any intermediate position such as shown in Fig. 2, the intermediate link 50 is not connected to the shaft 47. It is disconnected therefrom and instead coupled to another shaft 57 (Figs. 3, 4, and 7). This shaft extends in a direction parallel with the axis of the crawlers 5 and is appropriately journalled in a bearing 58 supported on the main frame 40 of the crawler 5. It carries a beveled pinion 59 meshing with beveled pinion 60 on shaft 47.

Accordingly, when it is desired to telescope the frame 6—7, the universal joint 49 is disconnected from shaft 47 and the crawler 5 is turned as by worm 41 to the position of Fig. 1 or to an intermediate position such as Fig. 2. Then the universal joint 49 can be coupled to shaft 57, and power is transmitted through the beveled gears 59 and 60 to the operating shaft 47. After the universal joint 49 is thus coupled to shaft 57, varying angled positions can be secured within the limits prescribed by the universal joints and the linkage 50. Ordinarily, it is possible to angle the crawler 5 by thirty degrees as previously mentioned from the position of Fig. 1 without interference from these intermediate power transmission mechanisms, while universal joint 49 is coupled to shaft 57.

It is apparent that the crawler 5, as a unit, can swing about the axis of the transverse shaft 34 as the vehicle travels over irregularities in the ground. In order to limit this vertical swing in either direction, there are placed a pair of stops 61 and 62 (Fig. 4) on the frame 40 of the crawler 5. These stops are arranged to contact with the lower surfaces of the end pipes 10 upon the limit of vertical movement of the crawler.

It is apparent that the operation of telescoping the frame 6—7 is accomplished easily by appropriate angling of the crawler 5 and appropriate manipulation of the various clamping collars, such as 13 and 18. The crawler 5 can be thus selectively positioned to perform either a tractive function or a telescoping function.

I claim:

1. In a device of the character described, a plurality of telescoping pipes extending laterally from a vehicle, a structure supported by the aid of said pipes, a supporting crawler adjacent the free end of the series of pipes, means for driving said crawler, said means including an extensible shaft deriving power from the vehicle, and means for varying the angular direction of the crawler traction, said driving means also including a device permitting the driving of the crawler at any of its angular positions.

2. In a device of the character described, a vehicle, a supporting crawler laterally spaced from the vehicle, means for adjusting the lateral spacing of the crawler from the vehicle, a source of power supported on the vehicle for driving it, means for varying the angular direction of the traction of the supporting crawler, and means for forming a driving connection between the source of power and said crawler, including a shaft driven by said source of power, a shaft driving said crawler, a drive element in telescoping relation to the power driven shaft and restrained against relative angular movement therewith, a connecting shaft between the crawler driving shaft and the drive element, and universal joints joining the ends of said connecting shaft respectively to the crawler driving shaft and to the drive element.

3. In a device of the character described, a vehicle, a crawler therefor, and means for supporting said vehicle on the crawler, comprising a pair of parallel members extending laterally from the vehicle body, a pair of blocks secured respectively to the members, a framework supported on said blocks and above said members, and means supported in the framework and forming a vertical pivot for the crawler.

4. In a device of the character described, a vehicle, a crawler therefor, and means for supporting said vehicle on the crawler, comprising a pair of parallel members extending laterally from the vehicle body, a pair of blocks secured respectively to the members, a framework supported on said blocks and above said members, a fifth wheel construction on said crawler adapted to support said frame, and means forming a vertical pivot for said construction.

5. In a device of the character described, a vehicle, a framework carried by the vehicle, a fifth wheel pivoted to the framework, a transverse member across the fifth wheel and supported thereby, and a crawler having side frames pivotally suspended from said member.

6. In a device of the character described, a vehicle, a supporting crawler laterally spaced from the vehicle, a source of power supported on the vehicle for driving it, means for forming a driving connection between the source of power and the crawler including a shaft driven by said source of power, a pair of shafts adapted for driving said crawler, said shafts being disposed at approximately right angles with each other, a drive element in telescoping relation to the power driven shaft and restrained against angular movement therewith, and a connecting shaft joined by a universal joint at one end to the drive element and having a universal joint at the opposite end adapted to be optionally connected to either of said crawler driving shafts.

7. In a device of the character described, a laterally adjustable extension frame connected to a vehicle, a supporting crawler arranged adjacent the free end of said frame, means for driving said crawler from power associated with vehicle including a pair of drive shafts on the crawler substantially at right angles with each other, a telescoping shaft including universal joints adapted to be optionally connected to one or the other of said drive shafts, and means for adjusting the angular direction of the crawler traction with respect to said extension frame through an angle greater than 90°.

LAWRENCE B. SCHAUER.